United States Patent Office 2,802,863

Patented Aug. 13, 1957

2,802,863

ACETYLATION PROCESS

Sigurd Fridtjof Jermstad and August Sturzenegger, Clifton, N. J., assignors to Hoffmann-La Roche Inc., Roche Park, Nutley, N. J., a corporation of New Jersey No Drawing. Application May 12, 1955, Serial No. 507,986

6 Claims. (Cl. 260—491)

This invention relates to an improvement in the manufacture of vitamin A acetate. Specifically, it relates to an improvement in methods of synthesizing vitamin A acetate wherein a terminal portion of the synthesis comprises the acetylation of 3,7-dimethyl-9-(2,6,6-trimethyl-1-cyclohexan-1-yl)-2,4,7-nonatriene-1,6-diol and the conversion of the acetylation product to vitamin A acetate. Exemplary (but not limitative) of such syntheses are the procedures described by Isler and coworkers, Helvetica Chimica Acta 30, 1911 (1947); ibid., 32, 489 (1949). By the process of the instant invention, cumbersome safeguard procedures hitherto found to be necessary in order to assure good yield and quality of the product, when manufactured on a commercial scale, have been obviated.

In a broad aspect, the invention relates to a process for the acetylation of 3,7-dimethyl-9-(2,6,6-trimethyl-1-cyclohexen-1-yl)-2,4,7-nonatriene-1,6-diol which comprises reacting the latter with isopropenyl acetate. More particularly, it relates to a process which comprises reacting 3,7-dimethyl-9-(2,6,6-trimethyl-1-cyclohexen-l-yl)-2,4,7-nonatriene-1,6-diol, dissolved in an inert organic solvent, with isopropenyl acetate in the presence of a basic condensing agent. By "inert solvent" is meant a liquid which in the quantity employed dissolves all or a substantial portion of the 3,7-dimethyl-9-(2,6,6-trimethyl-1-cyclohexen-1-yl)-2,4,7-nonatriene-1,6-diol, the isopropenyl acetate and the basic condensing agent employed, without solvolysis of any of these, i. e. without chemically reacting with any of these.

In a preferred embodiment, the invention provides a process for the acetylation of 3,7-dimethyl-9-(2,6,6-trimethyl-1-cyclohexen-1-yl)-2,4,7-nonatriene-1,6-diol which comprises reacting the latter, dissolved in an inert halogenated hydrocarbon solvent, with at least a molar proportion of isopropenyl acetate in the presence of a basic condensing agent comprising essentially at least one salt of a metal selected from the group consisting of alkali metals and alkaline earth metals with a weak acid selected from the group consisting of ammono acids and organic hydroxo acids having an acid dissociation constant $K_A$ between about $10^{-10}$ and about $10^{-40}$ (i. e. an ammono acid or organic hydroxo acid which is at least as acidic as ammonia but not more acidic than phenol) and having an anion which is substantially nonreactive toward isopropenyl acetate and 3,7-dimethyl-9-(2,6,6-trimethyl-1-cyclohexen-1-yl)-2,4,7-nonatriene-1,6-diol.

Any inert solvent may be employed, but it is advantageous to use an inert halogenated hydrocarbon solvent, preferably an inert halogenated hydrocarbon solvent having a dipole moment in the range of from about $1.1\times10^{-18}$ E. S. U.$\times$cm. to about $1.8\times10^{-18}$ E. S. U.$\times$cm. Illustrative solvents which can be employed are inert hydrocarbon solvents such as n-hexane and benzene; chloroform, methylene chloride, dichloroethylene, chlorobenzene and the like. Preferred as solvents are those chlorinated methanes which have dipole moments in the range specified above, particularly methylene chloride.

As basic condensing agent it is preferred to use a material which comprises essentially a salt as defined above, or a mixture of such salts. Illustrative of the alkali metals and alkaline earth metals which furnish the cationic portion of the salts of the class referred to above are: sodium, potassium, lithium, calcium, magnesium, strontium and the like. Illustrative of the weak acids which furnish the anionic portion of the salts of the class referred to above are the ammono acids and organic hydroxo acids referred to by Morton, Chemical Reviews 35, 1 (1944) in Table 5 at page 14. Representative weak acids of this type include: ammonia; lower alkanols such as methanol, ethanol, isopropanol, tertiary butanol and the like; and phenol. It will be apparent, then, that the class of salts which are preferred for use as basic condensing agents includes the following members, cited merely as being exemplary: sodium methoxide, sodium ethoxide, sodium amide, lithium amide, potassium ethoxide, calcium di(ethoxide), sodium tert-butoxide, sodium phenoxide, calcium di(phenoxide) and the like. Especially preferred basic condensing agents are sodium methoxide, sodium amide and sodium ethoxide. The basic condensing agents are advantageously employed in a proportion ranging from about 0.02 mol to about 0.5 mol, preferably in the range of from about 0.03 mol to about 0.1 mol, with respect to each mol of 3,7 - dimethyl - 9 - (2,6,6 - trimethyl - 1 - cyclohexen - 1-yl)-2,4,7-nonatriene-1,6-diol.

The reaction is conveniently effected by dissolving 3,7-dimethyl -9 - (2,6,6 - trimethyl - 1 - cyclohexen - 1 - yl)-2,4,7-nonatriene-1,6-diol in an easily handled quantity of an inert solvent of the class indicated above (the quantity of solvent is not critical), adding the basic condensing agent to the solution, and then adding isopropenyl acetate, with good agitation of the reaction mixture. The reaction can be conducted at any convenient temperature, e. g. between about minus 20° C. and the reflux temperature of the system, but is preferably conducted between about minus 10° C. and about 0° C. Acetone formed as a byproduct in the reaction need not be removed in order for the acetylation reaction to be successfully effected, nor is the removal of acetone necessary for the successful conversion of the acetylation product to vitamin A acetate. Moreover, the basic condensing agent need not be removed for the successful conversion of the acetylation product to vitamin A acetate. Consequently, it is often convenient to conduct the reaction at a low temperature, e. g. between about minus 10° C. and about minus 5° C., and then to use the cooled reaction mixture directly for the succeeding step of converting to vitamin A acetate, in which a low reaction temperature is desirable. Alternatively, the acetylation step can be conducted without external cooling, and after completion of the acetylation (either with or without removal of the byproduct acetone formed), the reaction mixture can be cooled down for the succeeding step of conversion to vitamin A acetate. The acetylation reaction is exothermic, and unless external cooling is applied, the temperature of the reaction mixture may (depending upon the particular inert solvent employed, and its quantity) reach the reflux temperature very soon after the addition of isopropenyl acetate to the reaction mixture is initiated.

It is preferred to use a quantity of isopropenyl acetate which is at least in molar equivalence to the quantity of 3,7 - dimethyl - 9 - (2,6,6 - trimethyl - 1 - cyclohexen-1-yl)-2,4,7-nonatriene-1,6-diol which it is desired to acetylate. Especially good results have been obtained when the molar proportion of isopropenyl acetate to vitamin A is from about 1.75 to about 2.6. A preferred ratio is from about 1.75 to about 2.2 molar proportions of isopropenyl acetate with respect to each mol of 3,7-dimethyl - 9 - (2,6,6 - trimethyl - 1 - cyclohexen - 1 - yl)-2,4,7-nonatriene-1,6-diol.

The invention is further disclosed in the following examples, which are illustrative but not limitative thereof:

*Example 1*

To a well-stirred mixture of 242 g. of 3,7-dimethyl-9 - (2,6,6 - trimethyl - 1 - cyclohexen - 1 - yl) - 2,4,7-nonatriene-1,6-diol in 500 cc. of methylene chloride at minus 10° C. was added 2.1 g. of sodium methoxide. While maintaining the temperature a minus 10° C. and stirring, a solution of 130.5 g. of isopropenyl acetate in 200 cc. of methylene chloride was added dropwise over a period of one-half hour. While maintaining the temperature at minus 10° C., the stirring was continued for an additional period of twenty minutes, after all of the isopropenyl acetate had been added, in order to assure as complete acetylation as possible. An aliquot of the reaction mixture (1% of the total volume) was removed for analysis. (Analysis indicated the presence of 1.60 acetyl groups per mol of 3,7-dimethyl-9-(2,6,6-trimethyl-1-cyclohexen-1-yl)-2,4,7-nonatriene-1,6-diol: the acetylation product comprised essentially a mixture of 1-acetoxy - 6 - hydroxy - 3,7 - dimethyl - 9 - (2,6,6 - trimethyl-1-cyclohexen-1-yl)-2,4,7-nonatriene and 1,6-diacetoxy - 3,7 - dimethyl - 9 - (2,6,6 - trimethyl - 1 - cyclohexen-1-yl)-2,4,7-nonatriene.)

The remainder of the reaction mixture, after withdrawal of the aliquot for analysis referred to above, was diluted to a total volume of 1.4 liters with methylene chloride, and cooled to minus 25° C. 310 cc. of concentrated aqueous hydrobromic acid (containing 48% HBr by weight), cooled to minus 25° C., was added quickly while stirring. Stirring was continued for six minutes, the temperature being allowed to rise to minus 15° C. during this period. To the reaction mixture at this point was added 2.4 liters of water, and stirring was continued for ten minutes. The reaction mixture was then allowed to stratify and the organic layer was quickly separated and dropped into a well-stirred mixture of 1 liter of water and 500 g. of ice. A solution of 120 g. of sodium bicarbonate in 1 liter of water was added and stirring was continued for three hours. The organic layer was separated and washed with water. Upon stripping off the solvent in vacuo, dissolving the residue in 250 cc. of anhydrous ethanol and cooling, crystalline vitamin A acetate precipitated.

*Example 2*

50 g. of 3,7-dimethyl-9-(2,6,6-trimethyl-1-cyclohexen-1-yl)-2,4,7-nonatriene-1,6-diol was dissolved in 125 cc. of n-hexane at room temperature. 0.9 g. of sodium methoxide was added. 42.8 g. of isopropenyl acetate was then added regularly over a period of twenty-five minutes. As soon as the addition of isopropenyl acetate was commenced, the temperature of the reaction mixture rose to 46° C. The stirring of the reaction mixture was continued for an additional period of thirty minutes, while maintaining a temperature of 50° C. The acetone formed during the reaction was distilled off as an azeotrope with n-hexane. The residue was washed well with water to remove the sodium methoxide, then the residual organic solution was again distilled to remove the remainder of the n-hexane. The residue comprised essentially acetylated 3,7-dimethyl-9-(2,6,6-trimethyl-1-cyclohexen - yl) - 2,4,7 - nonatriene - 1,6 - diol containing 1.81 acetyl groups per mol of 3,7-dimethyl-9-(2,6,6-trimethyl-1-cyclohexen-1-yl)-2,4,7-nonatriene-1,6-diol.

*Example 3*

100 g. of 3,7-dimethyl-9-(2,6,6-trimethyl-1-cyclohexen-1-yl)-2,4,7-nonatriene-1,6-diol was dissolved in 200 cc. of methylene chloride. 1.78 g. of sodium methoxide was added and the solution was cooled to minus 1° C. Then 66 g. of isopropenyl acetate was added over a period of eighteen minutes, while stirring and maintaining the temperature of the reaction mixture between minus 1° C. and plus 1° C. The stirring of the reaction mixture was continued at minus 1° C. to plus 1° C. for an additional period of one hour and forty minutes. The acetone formed during the reaction and the methylene chloride were distilled off. The residue was washed well with water to remove the sodium methoxide, then the residual organic solution was again distilled to remove the last of the methylene chloride. The residue comprised essentially acetylated 3,7-dimethyl-9-(2,6,6-trimethyl-1-cyclohexen-1-yl)-2,4,7-nonatriene-1,6-diol containing 1.84 acetyl groups per mol of 3,7-dimethyl-9-(2,6,6 - trimethyl - 1 - cyclohexen - 1 - yl) - 2,4,7 - nonatriene-1,6-diol.

*Example 4*

50 g. of 3,7-dimethyl-9-(2,6,6-trimethyl-1-cyclohexen-1-yl)-2,4,7-nonatriene-1,6-diol and 0.66 g. of sodium amide were stirred well with 100 cc. of methylene chloride, and the reaction mixture was cooled to 10° C. 33 g. of isopropenyl acetate was added with stirring over a period of nine minutes, while permitting the temperature of the reaction mixture to rise to 45° C. The stirring of the reaction mixture was continued without external cooling for an additional period of twenty minutes. The acetone formed during the reaction and methylene chloride were then distilled off, the residue was washed well with water to remove the sodium amide, and the last traces of methylene chloride were distilled off. The residue comprised essentially acetylated 3,7-dimethyl - 9 - (2,6,6 - trimethyl - 1 - cyclohexen - 1-yl)-2,4,7-nonatriene-1,6-diol containing 1.93 acetyl groups per mol of 3,7-dimethyl-9-(2,6,6-trimethyl-1-cyclohexen-1-yl)-2,4,7-nonatriene-1,6-diol.

*Example 5*

242 g. of 3,7-dimethyl-9-(2,6,6-trimethyl-1-cyclohexen-1-yl)-2,4,7-nonatriene-1,6-diol was dissolved in 700 cc. of methylene chloride, and then 2.16 g. of sodium methoxide was added. To the reaction mixture, initially at room temperature, was then added, with stirring, 168 g. of isopropenyl acetate over a period of thirty-five minutes, the temperature of the reaction mixture being permitted to rise to 46° C. The stirring of the reaction mixture was continued without external cooling for an additional period of five minutes. The acetone and methylene chloride were removed, and the sodium methoxide was washed out. The residue comprised essentially acetylated 3,7 - dimethyl - 9 - (2,6,6 - trimethyl - 1 - cyclohexen-1-yl)-2,4,7-nonatriene-1,6-diol containing 1.96 acetyl groups per mol of 3,7-dimethyl-9-(2,6,6-trimethyl-1-cyclohexen-1-yl)-2,4,7-nonatriene-1,6-diol.

*Example 6*

50 g. of 3,7-dimethyl-9-(2,6,6-trimethyl-1-cyclohexen-1-yl)-2,4,7-nonatriene-1,6-diol and 3.8 g. of sodium phenoxide were added to 100 cc. of methylene chloride with vigorous stirring. After cooling the reaction mixture to 10° C., 33 g. of isopropenyl acetate was added slowly over a period of 10 minutes, while stirring, the temperature of the reaction mixture being allowed to rise to 49° C. by the time the addition was completed. The stirring of the reaction mixture was continued without external cooling for an additional period of twenty minutes. The acetone and methylene chloride were removed by distillation, and the sodium phenoxide was removed by washing with water. The residue comprised essentially acetylated 3,7-dimethyl-9-(2,6,6-trimethyl-1-cyclohexen-1-yl)-2,4,7-nonatriene-1,6-diol containing 1.77 acetyl groups per mol of 3,7-dimethyl-9-(2,6,6-trimethyl-1-cyclohexen-1-yl)-2,4,7-nonatriene-1,6-diol.

*Example 7*

50 g. of 3,7-dimethyl-9-(2,6,6-trimethyl-1-cyclohexen-1-yl)-2,4,7-nonatriene-1,6-diol was dissolved in 100 cc. of methylene chloride, then 4.3 g. of calcium di(ethoxide) was added. The reaction mixture was cooled to 10° C., and while stirring well, 33 g. of isopropenyl acetate was added over a period of eight minutes, the temperature of the reaction mixture being permitted to rise to 26° C. during that time. The stirring of the reaction mixture was continued without external cooling for an additional period of fifty-two minutes. The acetone formed and solvent were removed and the calcium di(ethoxide) was washed out with water. The residue comprised essentially acetylated 3,7-dimethyl-9-(2,6,6-trimethyl-1-cyclohexen-1-yl)-2,4,7-nonatriene-1,6-diol containing 1.16 acetyl groups per mol of 3,7-dimethyl-9-(2,6,6-trimethyl-1-cyclohexen-1-yl)-2,4,7-nonatriene-1,6-diol.

*Example 8*

242 g. of 3,7-dimethyl-9-(2,6,6-trimethyl-1-cyclohexen-1-yl)-2,4,7-nonatriene-1,6-diol was dissolved in 700 cc. of methylene chloride. 7.7 g. of sodium tertiary butoxide was added. The reaction mixture was cooled to minus 10° C., and then 168 g. of isopropenyl acetate was added, with vigorous stirring, over a period of twenty-six minutes, while maintaining the temperature of the reaction mixture between minus 10° C. and minus 5° C. The stirring of the reaction mixture was continued for an additional period of ten minutes, while still maintaining the temperature of the reaction mixture below minus 5° C. Acetone and methylene chloride were distilled off and sodium tert-butoxide was washed out with water. The residue comprised essentially 1,6-diacetoxy-3,7-dimethyl-9-(2,6,6-trimethyl-1-cyclohexen-1-yl)-2,4,7-nonatriene.

*Example 9*

242 g. of 3,7-dimethyl-9-(2,6,6-trimethyl-1-cyclohexen-1-yl)-2,4,7-nonatriene-1,6-diol was dissolved in 700 cc. of methylene chloride. To the solution was added 4.3 g. of sodium ethoxide. The reaction mixture was cooled to minus 10° C., and 168 g. of isopropenyl acetate was added over a period of thirty minutes, the temperature of the reaction mixture being maintained below 3° C. The stirring of the reaction mixture was continued, with cooling to maintain the temperature below 3° C., for forty minutes longer. The resulting liquid contained in solution acetylated 3,7-dimethyl-9-(2,6,6-trimethyl-1-cyclohexen-1-yl)-2,4,7-nonatriene-1,6-diol containing 1.69 acetyl groups per mol of 3,7-dimethyl-9-(2,6,6-trimethyl-1-cyclohexen-1-yl)-2,4,7-nonatriene-1,6-diol; and additionally, acetone formed during the reaction and residues from the sodium ethoxide employed.

*Example 10*

242 g. of 3,7-dimethyl-9-(2,6,6-trimethyl-1-cyclohexen-1-yl)-2,4,7-nonatriene-1,6-diol was dissolved in 700 cc. of chloroform. 2.1 g. of sodium methoxide was added. 133.6 g. of isopropenyl acetate was added over a period of thirty minutes, while stirring well and maintaining the temperature at minus 10° C. Stirring was continued at minus 10° C. for an additional period of twenty minutes. The acetone formed and chloroform were distilled off. The sodium methoxide was washed out with water. The residue comprised essentially acetylated 3,7-dimethyl-9-(2,6,6 - trimethyl - 1 - cyclohexen - 1 - yl) - 2,4,7 - nonatriene-1,6-diol containing 1.69 acetyl groups per mol of 3,7-dimethyl-9-(2,6,6-trimethyl-1-cyclohexen-1-yl)-2,4,7 - nonatriene-1,6-diol.

It will be understod that the acetylated 3,7-dimethyl-9-(2,6,6-trimethyl-1-cyclohexen-1-yl)-2,4,7-nonatriene - 1,6-diol products obtained in Examples 2 to 10 above can be converted to vitamin A acetate by a method similar to that disclosed in Example 1 above, or by other methods known to the art.

We claim:

1. A process which comprises reacting 3,7-dimethyl-9-(2,6,6 - trimethyl - 1 - cyclohexen - 1 - yl) - 2,4,7 - nonatriene-1,6-diol, dissolved in an inert halogenated hydrocarbon solvent, with at least a molar proportion of isopropenyl acetate in the presence of a basic condensing agent consisting essentially of at least one salt of a metal selected from the group consisting of alkali metals and alkaline earth metals with a weak acid selected from the group consisting of ammono acids and organic hydroxo acids having an acid dissociation constant $K_A$ between about $10^{-10}$ and about $10^{-40}$ and having an anion which is substantially non-reactive toward isopropenyl acetate and 3,7 - dimethyl - 9 - (2,6,6 - trimethyl - 1 - cyclohexen-1-yl)-2,4,7-nonatriene-1,6-diol.

2. A process which comprises reacting 3,7-dimethyl-9-(2,6,6 - trimethyl - 1 - cyclohexen - 1 - yl) - 2,4,7-nonatriene-1,6-diol, dissolved in an inert halogenated hydrocarbon solvent having a dipole moment in the range of from about $1.1\times10^{-18}$ E. S. U.$\times$cm. to about $1.8\times10^{-18}$ E. S. U.$\times$cm., with from about 1.75 to about 2.6 molar proportions of isopropenyl acetate, in the presence of sodium ethoxide, at a temperature of from about minus 20° C. to reflux temperature.

3. A process which comprises reacting 3,7-dimethyl-9-(2,6,6 - trimethyl - 1 - cyclohexen - 1 - yl) - 2,4,7 - nonatriene-1,6-diol, dissolved in an inert halogenated hydrocarbon solvent having a dipole moment in the range of from about $1.1\times10^{-18}$ E. S. U.$\times$cm. to about $1.8\times10^{-18}$ E. S. U.$\times$cm., with from about 1.75 to about 2.6 molar proportions of isopropenyl acetate, in the presence of sodium methoxide, at a temperature of from about minus 20° C. to reflux temperature.

4. A process which comprises reacting 3,7-dimethyl-9-(2,6,6 - trimethyl - 1 - cyclohexen - 1 - yl) - 2,4,7 - nonatriene-1,6-diol, dissolved in an inert halogenated hydrocarbon solvent having a dipole moment in the range of from about $1.1\times10^{-18}$ E. S. U.$\times$cm. to about $1.8\times10^{-18}$ E. S. U.$\times$cm., with from about 1.75 to about 2.6 molar proportions of isopropenyl acetate, in the presence of sodium amide, at a temperature of from about minus 20° C. to reflux temperature.

5. A process which comprises reacting 3,7-dimethyl-9-(2,6,6 - trimethyl - 1 - cyclohexen - 1 - yl) - 2,4,7 - nonatriene-1,6-diol, dissolved in methylene chloride, with from about 1.75 to about 2.2 molar proportions of isopropenyl acetate, in the presence of a basic condensing agent selected from the group consisting of sodium amide, sodium methoxide, and sodium ethoxide, at a temperature of from about minus 10° C. to reflux temperature.

6. A process which comprises reacting 3,7-dimethyl-9-(2,6,6 - trimethyl - 1 - cyclohexen - 1 - yl) - 2,4,7 - nonatriene-1,6-diol, dissolved in methylene chloride, with from about 1.75 to about 2.2 molar proportions of isopropenyl acetate, in the presence of a basic condensing agent selected from the group consisting of sodium amide, sodium methoxide and sodium ethoxide, at a temperature of from about minus 10° C. to reflux temperature, and converting the acetylated 3,7 - dimethyl - 9 -(2,6,6 - trimethyl - 1-cyclohexen-1-yl)-2,4,7-nonatriene-1,6-diol, without isolation thereof and while still dissolved in methylene chloride, to vitamin A acetate.

References Cited in the file of this patent

UNITED STATES PATENTS

| | | |
|---|---|---|
| 2,422,016 | Hull et al. | June 10, 1947 |
| 2,482,066 | Hull et al. | Sept. 13, 1949 |
| 2,610,207 | Lindlar et al. | Sept. 10, 1952 |
| 2,610,208 | Surmatis | Sept. 10, 1952 |

OTHER REFERENCES

Hagemeyer et al.: Ind. Eng. Chem. 41 (1949), 2920–4.